United States Patent [19]

Pinto et al.

[11] Patent Number: 4,695,442
[45] Date of Patent: Sep. 22, 1987

[54] AMMONIA SYNTHESIS PROCESS

[75] Inventors: Alwyn Pinto, Middlesbrough; John B. H. Johnson, Sedgefield, both of England

[73] Assignee: Imperial Chemical Industries PLC, London, England

[21] Appl. No.: 703,531

[22] Filed: Feb. 20, 1985

[30] Foreign Application Priority Data

| Feb. 3, 1984 [GB] | United Kingdom | 8405591 |
| Apr. 7, 1984 [GB] | United Kingdom | 8417016 |
| Apr. 7, 1984 [GB] | United Kingdom | 8417017 |
| Sep. 10, 1984 [GB] | United Kingdom | 8425508 |

[51] Int. Cl.⁴ .............................................. C01C 1/04
[52] U.S. Cl. ...................................... 423/359; 55/25; 55/68; 252/376
[58] Field of Search ........................ 423/359; 55/68; 252/377, 376

[56] References Cited

U.S. PATENT DOCUMENTS

| 3,441,393 | 1/1966 | Finneran et al. | 48/197 |
| 3,442,613 | 5/1969 | Grotz | 423/354 |
| 4,296,085 | 10/1981 | Banquy | 252/373 |
| 4,375,363 | 3/1983 | Fuderer | 55/25 |
| 4,409,196 | 10/1983 | Skinner et al. | 252/375 |
| 4,414,191 | 11/1983 | Fuderer | 423/359 |
| 4,479,925 | 10/1984 | Shires et al. | 423/359 |
| 4,512,780 | 4/1985 | Fuderer | 55/68 |
| 4,553,981 | 11/1985 | Fuderer | 423/648 R |
| 4,592,860 | 6/1986 | Fuderer | 252/376 |

FOREIGN PATENT DOCUMENTS

| 885126 | 3/1981 | Belgium . |
| 3206513 | 8/1983 | Fed. Rep. of Germany . |
| 195502 | 11/1984 | Japan . |
| 1267603 | 3/1972 | United Kingdom . |
| 2103199 | 2/1983 | United Kingdom . |
| 2126573 | 3/1984 | United Kingdom . |
| 2154566 | 2/1985 | United Kingdom . |

OTHER PUBLICATIONS

Hydrocarbon Processing, Nov. 1983, p. 80.
Hydrocarbon Processing, Nov. 1979, p. 133.
Ammonia Production With Higher Efficiency, W. F. van Weenen et al., Nitrogen No. 127, Sep./Oct. 1980.
European Chemical News, Oct. 20, 1978, pp. 39 and 47.

Primary Examiner—John Doll
Assistant Examiner—Wayne A. Langel
Attorney, Agent, or Firm—Cushman, Darby & Cushman

[57] ABSTRACT

Ammonia synthesis gas is made from a raw gas comprising hydrogen, carbon dioxide and medium boiling point gases including nitrogen in excess of the proportion required in ammonia synthesis gas, by a pressure swing adsorption process characterized by feeding to the adsorbent a raw gas in which hydrogen and total medium boiling point gases are present in a volume ratio in the range 1.25 to 2.5, and the medium boiling point gases comprise nitrogen to the extent of at least 90% v/v on the total such gases. Preferred ways of making the raw gas, of ensuring purity of the product gas and of recovering useful heat are described.

15 Claims, 6 Drawing Figures

AMMONIA SYNTHESIS PROCESS

This invention relates to the production of hydrogen and in particular to the production of purified ammonia synthesis gas from a raw gas.

Conventionally most ammonia synthesis gas is made by one of these two routes:

A. Steam reforming route:
 (a) incomplete catalytic reaction of reformable hydrocarbon with steam;
 (b) reaction of the product of (a) with air to introduce nitrogen and adequately to complete reaction of hydrocarbons;
 (c) catalytic shift reaction with steam of carbon monoxide in the product of (b);
 (d) removal of carbon dioxide in a regenerable absorbent liquid; and
 (e) removal of residual carbon oxides by methanation; and B. Partial oxidation route:
 (a) separation of air to give liquid nitrogen and high-concentration oxygen;
 (b) partial oxidation of a carbonaceous feedstock with the oxygen and possibly also steam to give a carbon monoxide rich gas;
 (c) catalytic shift reaction with steam of carbon monoxide in the product of (b);
 (d) removal of carbon dioxide in a regenerable absorbent liquid; and
 (e) contacting the resulting gas with liquid nitrogen to condense out residual carbon oxides and to introduce nitrogen.

Hereinafter the product of stage (c) in either route, that is, the gas after shift but before complete carbon dioxide removal will be referred to as raw gas.

Recently processes capable of removing various gases from mixtures with hydrogen by pressure-swing selective adsorption have been developed and put into industrial use for producing pure hydrogen. In one such process the further stage of producing ammonia synthesis gas by adding nitrogen to the pure hydrogen has been proposed (European Chemical News 20 Oct. 1978, 39, 47). In other proposals (BE-A No. 885126, GB-A No. 2103199) the nitrogen has been introduced as a purge gas in regenerating the selective adsorbent. In either of such processes the nitrogen is derived from some extraneous source such as air separation and the raw gas has been made either by route B or by a modified route A without the nitrogen-introducing stage (b). It would in principle be more convenient if the nitrogen could be introduced as air; however, in the proposal on these lines that is described in GB-A No. 2126573 there is only a low percentage (72.4%) recovery of hydrogen. In DE-A No. 3206513 such a process is proposed but is said to be impracticable unless a nitrogen-passing adsorbent is used.

We have now discovered from a study of the adsorption properties of the gases involved that over a narrow range of raw gas composition the content of medium boiling point gases especially nitrogen is in balance with the contents of hydrogen and carbon dioxide to produce ammonia synthesis gas at a high percentage hydrogen recovery without excessive adsorption bed volume and with no or little external purge gas.

According to the invention a pressure swing adsorption process (PSA) for producing ammonia synthesis gas from a raw gas containing hydrogen $H_2$, carbon dioxide $CO_2$ and at least one medium boiling point gas (MB) selected from the class consisting of nitrogen $N_2$, carbon monoxide CO, methane $CH_4$ and argon Ar, the nitrogen content being greater than that required in ammonia synthesis gas, characterised by feeding to the adsorbent a raw gas in which hydrogen and total medium boiling point gases are present in a volume ratio in the range 1.25 to 2.5, especially 1.4 to 2.1 and the medium boiling point gases comprise nitrogen to the extent of at least 90% v/v the total of such gases.

The raw gas fed to PSA may contain up to a few percent by volume of water vapour, depending on the capacity of the process to handle it, for example as a result of including a silica gel water adsorption section. For the generality of PSA processes the water vapour content of the raw gas is under 1% v/v.

The MB components preferably comprises at least 95% v/v of $N_2$. The high $N_2$ percentage and the substantial nitrogen affinity of the adsorbent have the effect that $N_2$ adequately displaces $CO_2$ during regeneration of adsorbent.

Typical MB contents in the raw gas are, in % v/v on a dry basis:
CO up to 2
$CH_4$ up to 5, especially up to 1
Ar up to 1.
(Other noble gases may be present. In practice helium and neon form part of the ammonia synthesis gas product and krypton and xenon part of the MB component, but their concentrations are too low to affect the operation of the process).

The $CO_2$ content of the raw gas is preferably under 25% v/v on a dry basis. It may be substantially less as a result of a preliminary $CO_2$-removal treatment, but is preferably at least 10% as in raw gas not so treated. For optimal operation of the process the volume ratio $MB/CO_2$ is in the range 1.3 to 2.5.

The composition of the raw gas is shown on the accompanying diagram, FIG. 1 hereinafter.

Corresponding to the high $N_2$ content of the MB components, the percentage $N_2$ recovery is typically less than 80, for example in the range 45 to 65.

The PSA is broadly of the types described in U.S. Pat. No. 3,430,418, 3,564,816 and 3,986,849, in which each bed takes part successively in these steps:
adsorption
co-current pressure equalisation (preferably multiple)
co-current partial depressurisation to purge another bed
counter-current depressurisation ("dump")
purge (optional)
re-pressurisation.

At least 4 beds are used, preferably at least 5, in order to provide multiple pressure equalisations and thus increase product percentage recovery. More preferably at least 10 beds are used.

In the ensuing definition of the special characteristics of PSA the terms "inlet" and "outlet" refer to the flow of gas during the adsorption step, and the terms "co-current" and "counter-current" mean toward such outlet or inlet respectively. When appropriate, beds are identified by the index letters used in FIG. 3 accompanying, but this is for ease of understanding and does not limit the invention to the cycle shown in that figure.

The PSA differs from those previously proposed in the compositions of the feed and product gases and in the detailed operations appropriate thereto. Preferably it includes the following features (a) an adsorption step producing a product gas varying in composition with time. Typically the $H_2/N_2$ ratio is low at the beginning because the bed (A) has been re-pressurised counter-currently with an $H_2+N_2$ mixture and thus carries a relatively high loading of $N_2$ at its outlet end. However, as adsorption flow proceeds this $N_2$ is gradually desorbed by gas from which components ($CO_2$, $CH_4$) other than $H_2$ have been adsorbed further upstream in the bed, and thus the $H_2/N_2$ ratio increases. With continuing adsorption flow, the $N_2$-loaded part of the bed moves further towards the bed outlet and $N_2$-breakthrough takes place. Such $N_2$-breakthrough is allowed to increase until the integrated $H_2/N_2$ ratio over the whole adsorption step is at the level required in the product ammonia synthesis gas. The adsorption flow is stopped well before the $CO_2$ adsorption front reaches the bed outlet. The variation of $H_2/N_2$ ratio with time is not necessarily symmetrical, but it is believed preferable for the final ratio to be close (e.g. within 20%) of the initial ratio. The highest ratio attained can be for example up to about double the lowest ratio. Consequently it is preferred to use a buffer vessel for evening-out the product gas composition or (instead or in addition) a PSA system having a plurality of adsorption beds in operation simultaneously but out-of-phase. Using 3 such beds a 100% variation in ratio using a single bed can be decreased to 7%, typically.

(b) at the end of the adsorption step the bed contains these zones:
1. a zone containing mainly $CO_2$ as adsorbate;
2. a zone containing some $CO_2$ but partly loaded with MB;
3. a zone containing very little $CO_2$ but loaded with MB at a level decreasing from the zone boundary towards the bed outlet. The main function of this zone is to remove $N_2$ incompletely from the gas so that the $H_2/N_2$ integrates to the required level. If $CH_4$ is present in the gas leaving zone 2 it is removed in zone 3. At the end of the adsorption step zone 3 is still long enough to remain within the bed during subsequent co-current flow in pressure equalisation and depressurisation.

(c) at least one co-current downward pressure equalisation step following the end of an adsorption step in which the gas still in the adsorber as void space gas and adsorbed gas and initially at adsorption pressure ("highest") is fed from the adsorber (A) outlet into the outlet end of a fresh or previously regenerated bed (B). In the adsorber (A) this step advances the fronts of all those zones towards the outlet but zone 3 remains substantial in length. In the fresh or regenerated bed (B) this step moves the zones back towards the inlet, but also adsorbs $N_2$ in the outlet zone, since the $N_2$ partial pressure in the gas fed from the adsorber outlet is higher than in the purge gas (to be described) with which the fresh or regenerated bed was previously contacted.

The number of such co-current pressure equalisation steps is for example as follows:
(i) one, in a simple 4-bed system as depicted for example in FIG. 2 of U.S. Pat. No. 3,430,418 and reproduced hereinafter;
(ii) two, in a modified 4-bed system as depicted for example in FIG. 2 of U.S. Pat. No. 3,564,816;
(iii) two, in a 5-bed system as depicted for example in FIG. 3 of U.S. Pat. No. 3,430,418;
(iv) three, in systems using 6 or more beds, for example the 8-bed and 10-bed systems described in U.S. Pat. No. 3,986,849.

In (ii) the two equalisation steps are separated by a depressurisation-to-purge step (see below), but in (iii) and (iv) they are consecutive.

The pressure after equalisation will be referred to as "intermediate", qualified by first, second etc in the event that more than one equalisation step is used.

(d) a co-current depressurisation-to-purge step following the equalisation step or steps, and providing a purge stream of gas throttled from the intermediate pressure in the previously equalised adsorber (A), which is fed countercurrently through a bed (C) that has just been countercurrently depressurised (dumped). In the adsorber (A) this step further advances the main fronts of all three zones and also a tail of each zone towards the outlet, but zone 3 still remains substantial in length, so that the gas leaving it is $CO_2$-free. However, that gas is relatively rich in $N_2$, since $H_2$ was largely lost in the equalisation step or steps and $N_2$ is now desorbed as a result of lower pressure and of displacement by advancing $CO_2$. In the dumped bed (C) the zones are moved further back towards the inlet and further $CO_2$ and MB gases are carried away, thus effecting a purge of this bed. The outlet end of the dumped bed (C) adsorbs a significant quantity of $N_2$ from the purge stream and, if the tail of the front of zone 1 has approached the outlet of the dumped bed (C) in previous co-current depressurisation, the purge stream now moves it backwards and decreases the risk of trace $CO_2$ breakthrough.

The flow of purge stream is stopped when the pressure in the adsorber (A) has fallen to a lower-intermediate level suitable for the operation of the step described in the next paragraph.

(e) a counter-current depressurisation ("dump") step in which the gas remaining in the adsorber (A) at lower-intermediate pressure is released from the bed inlet. The resulting ("lowest") pressure is commonly ambient but can be desired be higher, or lower as a result of using a vacuum pump: preferred pressures are described below. In the adsorber the dump step moves the fronts of all three zones back towards the inlet but this effect is small towards the outlet end because there the quantity of gas flowing is small, and consequently any small "tail" quantity of $CO_2$ that approached the outlet end during pressure equalisation and co-current depressurisation-to-purge tends to remain there (see steps (d) and (f)) and thus could be desorbed during a subsequent adsorption step into the product ammonia synthesis gas. Apart from such residual $CO_2$, the effect of the dump step is to expel a substantial part of the $CO_2$ acquired in the adsorption step, and it is characteristic of the MB content of the raw gas that the MB gas present in the bed before the dump step is in balance with what is required to displace such $CO_2$. As shown in accompanying FIG. 2, an $H_2/MB$ ratio lower than the specified lower limit would exact a severe penalty in the bed volume needed, and a ratio higher than the specified upper limit would lead to inadequate removal of $CO_2$. The fraction of the adsorbed $CO_2$ that is expelled in the dump step is greater, the lower the $H_2/MB$ ratio. The remainder of the adsorbed $CO_2$ is removed in one or more purge steps.

(f) a counter-current purge step using gas from a bed (D) undergoing co-current depressurisation. This effect of this purge on the dumped bed (C) was described in paragraph (d) above. If the $H_2/MB$ molar ratio in the raw gas is in the lower part of the defined range, this purge may be unnecessary or may be adequately effected using only a part of the gas available from the co-current depressurisation; if desired, co-current depressurisation gas, dump gas, initial purge gas and final purge gas can be fed out to different uses appropriate to their compositions. Usually it is preferred to use this purge step to ensure desorption of the tail of the $CO_2$ front, to help establish a quantity of adsorbed $N_2$ at the end outlet and to keep the $CO_2$ main front well back from the bed outlet in the event that it has advanced as a result of chance raw gas composition fluctuations; the latter is of concern mainly at higher $H_2$/MB ratios in the defined range.

(g) a counter-current purge step using gas from outside the PSA cycle. Such "external" purge is usually unnecessary and is envisaged as a remedy in the event of excessive advance of the $CO_2$ front during adsorption. Gases conveniently usable are ammonia synthesis loop purge gas or adsorber product gas or some gas external to the whole ammonia production plant. However, it is a major advantage of the invention that the nitrogen purge specified in GB-A No. 2103199 and BE-A No. 885126, which necessitates an air-separation plant and makes air-reforming of hydrocarbon feedstock unsuitable, is not used.

If in (f) or (g) a remedial purge is to be operated, this can be intermittent and a spare bed can be provided.

(h) an upward counter-current pressure equalisation step in which the purged adsorber (A) receives at its outlet end the gas from an adsorber (B) that has ended its adsorption step, as described in paragraph (c) above. As a result of the direction in which the gas enters the bed, the fronts in it are moved back towards its inlet, and the zone nearest its outlet is brought towards equilibrium with the relatively $N_2$-rich gas delivered by the downward-equalising adsorber.

(i) a counter-current re-pressurisation step in which product gas is diverted from the outlet stream into the outlet of the adsorber (A) during or after upward pressure equalisation. The feed of product gas takes place preferably throughout the equalisation as well as after it, so that the rate of flow of such gas does not vary much during the whole cycle. Alternatively or additionally the product gas feed may be from a reservoir. At the end of re-pressurisation the adsorber is ready to return to adsorption duty.

(j) the adsorption ("highest") pressure is in the range 25 to 50, especially 30 to 40, bar abs. and the purge and final dump ("lowest") pressure is over 1, especially in the range 3 to 5 bar abs. The ratio of highest pressure to lowest pressure is preferably in the range 8 to 25, for example 10 to 15.

Further processing of the purged and dumped gas is described below.

The adsorbent used in the PSA can be chosen from among available materials including varieties of active carbon, zeolites and silica gel, in respect of which gas adsorption data are published or are available from companies specialising in adsorption. Among the zeolites, those of pore diameter 5 Angstrom units and less are generally useful in view of the small size of the molecules involved, for example calcium zeolite A. Molecular sieves providing substantially increased adsorption of CO relative to $N_2$, for example by a factor of more than 10, such as mordenite appear despite their larger pore diameter, to be potentially of value but are not normally needed.

Whereas the CO content of the raw gas is specified as less than 2% v/v on a dry basis, it is preferably substantially less, especially under 0.5% v/v. Thus the shift stage producing the raw gas preferably includes low temperature shift over a copper-containing catalyst at under 250° C. outlet temperature. To ensure a synthesis gas CO content low enough to avoid poisoning an iron catalyst used in ammonia synthesis the product gas from the PSA system is preferably methanated, also as described hereinafter. If a ruthenium ammonia synthesis catalyst is to be used, the CO content is less critical and such post-PSA methanation may be unnecessary. To ensure a very low raw gas CO content, for example under 0.01%, the raw gas is subjected preferably to selective catalytic oxidation or methanation as described hereinafter.

The invention provides also a combination process comprising (a) reacting a carbonaceous feedstock with steam and an $O_2$—$N_2$ mixture using process conditions and reactant proportions so as to produce a crude gas in which the ratio by moles $$\frac{CO + H_2}{MB - CO}$$

is in the range 1.25 to 2.5, especially 1.4 to 2.1 and the MB gas consists of $N_2$ to the extent of at least 90% v/v;

(b) subjecting the crude gas to catalytic shift reaction with steam to convert CO substantially to $CO_2$+$H_2$; and (c) removing $CO_2$ and MB by PSA as hereinbefore defined, whereby to produce a $N_2$/$H_2$ ammonia synthesis gas.

In the crude gas leaving stage (a) the CO+$CO_2$ content is preferably in the range 10-25% v/v on a dry basis and the MB gases are preferably $N_2$ to the extent of at least 95%.

In step (b) the conversion of CO is such as to have less than 2, especially less than 0.5, % v/v of CO on a dry basis.

At some stage in the combination process before PSA provision is made to remove any sulphur compounds that may be introduced with the feedstock. Sulphur compounds removal can be applied to crude gas or shifted gas but in preferred processes in which stage (a) involves catalytic reaction of a volatilisable feedstock, is applied to the feedstock before stage (a).

Stage (a) could in principle be carried out in a single reaction of all three reactants but when catalysed is preferably carried out in two parts, one involving feedstock and steam, the other involving also $O_2$.

In one form of this stage, a volatile hydrocarbon feedstock is reacted with steam over a catalyst heated externally ("primary reforming") to produce a gas containing CO, $CO_2$, $H_2$ and $CH_4$ and the resulting gas is reacted with the $O_2$—$N_2$ mixture adiabatically to convert $CH_4$ to CO+$H_2$ and introduce $N_2$ ("secondary reforming"). Such a sequence resembles crude synthesis gas generation as described in our U.S. Pat. No. 4,298,588; if desired, the reaction with steam could be carried out by preheating followed by adiabatic reaction, as described in our U.S. Pat. No. 4,303,982.

In a preferred form of stage (a) the heat required for primary reforming is obtained by indirect heat exchange with the hot gas resulting from secondary reforming. It is fortunate that the heat balance of the two reforming stages is such that when using air as the $O_2$—$N_2$ mixture the (CO+$H_2$)/(MB−CO) ratio and N₂ content in the specified range can be readily attained. However, the invention includes also the use of moderately enriched air containing up to 35% of $O_2$ and $O_2$-depleted air containing down to 15% v/v $O_2$. Thermodynamic data permitting calculation of temperatures, pressures and reactant proportions are readily available to chemical engineers.

Upstream of PSA there can be partial removal of $CO_2$, especially when the H/C atomic ratio is less than 3 in the hydrocarbon feedstock.

In a further form of stage (a) the feedstock is methanol and is reacted with steam and air in a single catalytic operation.

After PSA and after or before any final CO methanation the PSA product gas is compressed to ammonia synthesis pressure, which is usually over 40 bar abs, for example in the range 40-120 bar abs as in recently proposed processes or in the range 120-250 bar abs as in most processes in industrial operation at present. Especially when a centrifugal compressor is used, it is important to avoid gross variations in the molecular weight of the synthesis gas, and therefore the PSA system may include a buffer vessel or 3 or more simultaneous adsorbers out of phase as already described. For the sake of a steady flow rate to the compressor the re-pressurisation of the adsorber before the adsorption step is by a steady slow flow of PSA product gas.

The ammonia synthesis stage can be of any convenient type and may, indeed, be carried out in existing plant designed and used in conjunction with conventional synthesis gas generation. It will typically be subject to one or more of the following detailed modifications:

(a) unless a product gas $H_2/N_2$ ratio different from 3 has been chosen, the synthesis purge gas rate will be very small and will not justify purge gas separation for recovery of ammonia and $H_2$. Conveniently such purge gas is recycled to synthesis gas generation;

(b) since the PSA product gas is very pure and non-reactants do not accumulate in the circulating synthesis gas, the partial pressures of $N_2$ and $H_2$ are higher and thus the rate of production of ammonia is higher. Alternatively energy can be saved by decreasing the gas circulation rate.

Other combinations designed for energy recovery are described below.

The invention provides a further combination process in which the $CO_2$-rich waste gas stream is concentrated and fed to one or more of the following processing stages:
(a) production of solid $CO_2$;
(b) production of liquid $CO_2$;
(c) production of urea.

Such concentration of $CO_2$ can be by means of an adsorptive treatment or wet treatment, for example by absorption in a regenerable liquid such as aqueous potassium carbonate optionally containing an activator, an alkanolamine or a pressure-sensitive solvent. If the $CO_2$ is to be used for urea production it can be recovered as ammonium carbonate. If the $CO_2$-rich stream is dumped and purged at the preferred pressure 3-5 bar abs. it can be subjected to concentration without compression; however, the invention includes a compression stage if the dump and purge pressure is lower or if later processing requires higher pressure. Although the PSA system would be less expensive if $CO_2$ were removed upstream thereof, the disadvantages would be incurred that the whole ammonia production process would include a wet stage; the necessary $CO_2$ removal plant would have to handle much larger gas volumes at higher pressure, and an additional pressure-drop would be incurred before PSA.

A result of concentrating the $CO_2$ is to produce a stream containing $H_2$ and MB gases which is a much more convenient fuel than the $CO_2$-rich stream and is more uniform in composition.

Further combination processes designed to afford energy economy are described hereinafter.

The catalytic shift reaction should preferably be of the "clean" type, e.g. when selective oxidation or methanation is to precede PSA. The shift reaction can be carried out in conventional ways, for example "high temperature", with an inlet temperature of 330°-400° C., outlet temperature 400°-500° C., usually over an iron oxide/chromia catalyst, and affording an outlet CO content in the range 2-4% v/v on a dry basis so that a further stage is needed;

"low temperature", with an inlet temperature of 190°-230° C., outlet temperature 250°-300° C., usually over a catalyst comprising metallic copper, zinc oxide and one or more other difficultly reducible oxides such as alumina or chromia, and affording an outlet CO content in the range 0.1 to 1.0 especially under 0.5% v/v on a dry basis;

"combination", using the sequence of high temperature shift, cooling by indirect heat exchange and low temperature shift; if desired, either shift stage can be subdivided with interbed cooling.

Alternatively a "medium temperature" shift can be used, in which the inlet temperature is in the range 250°-325° C. and the outlet temperature up to 400° C. A suitably formulated supported copper catalyst can be used. The outlet CO content is up to 2.0% v/v on a dry basis.

Whichever shift method is used, it is preferably operated in indirect heat exchange with a coolant, especially water under pressure. Thus the catalyst can be disposed in tubes surrounded by the water, or vice versa. Utilisation of the heat taken up by the water may be by generating steam at for example 15-50 bar abs. pressure and use of such steam as feed to the shift stage or in generating the CO containing gas fed to shift.

Preferably the shift stage in heat exchange with water is characterised by controlling the water flow rate so that incomplete vaporisation takes place, and contacting the resulting steam/water mixture with a gaseous hydrocarbon, whereby to form a mixture thereof with water vapour. An alternative shift stage is carried out by (a) reacting carbon monoxide with steam over a catalyst in indirect heat exchange with boiling water under pressure in a first circuit;

(b) condensing the resulting steam in indirect heat exchange with water in a second circuit and returning the resulting first circuit condensate to the indirect heat exchange in stage (a);

(c) contacting the resulting optionally partly boiling hot second circuit water with a gaseous hydrocarbon, whereby to form a mixture thereof with water vapour.

More particularly the gaseous hydrocarbon/water vapour mixture is fed to a gasifier, especially a catalytic endothermic steam reformer and/or catalytic partial oxidation, and the product of the gasifier undergoes the shift reaction in heat exchange with the water. The shifted gas is cooled further, preferably by direct heat exchange with water. In the shift stage first mentioned water returned from the contacting and make-up water are conveniently fed to the water side of the heat exchange surfaces in the reactor. In the alternative shift step returned water and make-up water become the second circuit water. To maintain the thermal balance of the process and to adjust the temperatures of the gases to be contacted with water, the hot steam/water mixture or second circuit water may be indirectly heat exchanged with the product of the gasifier before it enters the shift steps; warm water may be produced by direct cooling of shifted gas and may be indirectly heat exchanged with shifted gas.

The shifted gas is finally cooled to below the dewpoint of steam, liquid water is separated from it and stages are carried out to remove bulk and residual $CO_2$ and residual CO from it: preferably PSA is used but conventional steps of $CO_2$ removal in a regenerable liquid absorbent and final carbon oxides removal by catalytic methanation can be used, in a modified process.

To provide power requirements of process sequences producing gas at high pressure the invention provides a combination process having the stages of
(a) reacting a hydrocarbon feedstock with steam over an externally heated catalyst;
(b) subjecting the product of stage (a) to a shift reaction;
(c) removing carbon oxides from the shifted gas;
(d) recovering heat from the hot product gases of stage (a) and/or stage (c) and/or from combustion gases formed in providing the external heating in stage (a), and using such recovered heat to power an engine driving a compressor for the product of stage (c) and/or for a gas taking part in stage (a):
characterised by
(i) in stage (d) recovering said heat by heat exchange with reactants and/or liquid water but substantially without producing external steam;
(ii) carrying out stage (c) by selective adsorption, producing a $CO_2$-containing off gas including combustibles and using it to power a gas expander producing at least part of the compression power in stage (d).

In stage (i) the process can produce a steam-water mixture (to be used in a saturator), which is to be distinguished from external steam fed to a turbine or mixed in gaseous form with the feedstock in stage (a) or used in some way outside the process stages listed. Alternatively steam is raised only in a closed ("first") circuit and used to heat the water to be used in the saturator.

The energy recovery in stage (ii), including heat recovery from gas turbine effluent, usually needs to be supplemented by energy importation, such as in an independently fueled gas turbine or of electricity, but the over-all energy consumption is typically less than in a conventional process with heat recovery by steam raising.

After PSA there may be further purification steps, depending on whether the ammonia synthesis catalyst is of the ruthenium or the iron type. Thus:
1. For a ruthenium catalyst the sub-residual CO is unlikely to be a poison, hence no further purification is needed. However, the CO can react to methane over the ammonia synthesis catalyst, thus possibly producing an undesired exotherm;
2. If the gas from PSA is methanated before the ammonia synthesis the disadvantage of an undesired exotherm in the synthesis is avoided, and the water produced in methanation does not affect the ruthenium catalyst;
3. If an iron synthesis catalyst is to be used, the gas from PSA may be methanated and dried before it reaches that catalyst. Drying can be by means of a regenerable solid adsorbent, but most conveniently the gas is contacted with liquefied ammonia, suitably as described below If post-PSA methanation is used, the "sub-residual" CO content of the gas leaving PSA is typically in the range 0.05 to 0.20% v/v. Methanation is carried out typically at 250°–400° C. over a supported nickel or cobalt or possibly ruthenium catalyst.

Methanation takes place conveniently after any compression of the gas from the synthesis gas generation pressure (10–60 especially 25–50 bar abs.) to ammonia synthesis pressure (30–300, especially 40–120 bar abs.), because the gas leaving PSA is very dry.

The methanated gas contains 0.05 to 0.2% v/v of water vapour and is free of $CO_2$. Consequently it can be adsorbed by liquid ammonia without significantly contaminating it. For this purpose the methanated gas is mixed with reacted synthesis gas before, or after partial, removal of ammonia therefrom, and the mixture is cooled and passed to an ammonia separation catchpot.

If the CO content of the gas entering PSA is decreased by selective oxidation, the oxidising agent can be air, enriched air or high concentration oxygen, depending on how much nitrogen can be accepted in the PSA feed gas. The selective oxidation catalyst is suitably supported platinum (0.01 to 2.0% w/w) containing possibly one or more of manganese, iron, cobalt or nickel as a promoter. A description of a suitable selective oxidation process is given in UK No. 1555826 and in the articles by Colby et al (23rd Symposium on safety in ammonia plants and related facilities, Am. Inst. Chem. Engrs. Conv., Miami, November 1978) and Bonacci et al. (Am. Inst. Chem. Engrs. Symposium, Denver, August 1977). The inlet temperature is typically below 50° C. and the outlet temperature under 100° C., especially under 80° C., in order to assure high selectivity for CO oxidation and against $H_2$ oxidation.

To ensure thorough CO removal, possibly making post-PSA methanation unnecessary, the selective oxidation is preferably carried out in heat exchange with a coolant or, more conveniently in a plurality of stages in succession, each fed with oxidant sufficient to oxidise part of the CO initially present but insufficient to produce an adiabatic temperature rise to over 80° C., and with inter-stage indirect heat exchange cooling.

If the CO content of the gas entering PSA is decreased by selective methanation the shifted gas is passed to the methanation stage preferably without removing unreacted steam, and conveniently without a change in temperature. This makes possible a valuable simplification, in that the methanation catalyst can be disposed in an adiabatic bed at the downstream end of the reactor in which the cooled shift stage or the lowest temperature shift takes place.

The combination shift+methanation reactor constitutes a further feature of the invention.

The conditions favouring methanation of CO preferentially to $CO_2$ include the following
relatively low temperature, for example under 300°, especially under 200° C.;
relatively high pressure, for example over 20, especially over 30 bar.
noble metal, especially ruthenium-containing, catalyst.

In order to control temperature, the catalyst may be disposed in a zone having indirect heat exchange surfaces, for example in tubes surrounded by coolant or in a bed having tubes through which coolant is circulated; however, at the preferred shift outlet CO content an adiabatic bed suffices.

After methanation, the gas is cooled to remove unreacted steam as condensate, then passed to PSA.

The ammonia synthesis system in which the gas is used involves synthesis at a pressure typically in the range 30–300, especially 40–120 bar abs., and a catalyst outlet temperature preferably in the range 300°–450° C. The catalyst can be metallic iron with one or more promoter oxides such as those of potassium and aluminium, and possibly containing up to 10% of cobalt (calculated as $Co_3O_4$ on a composition in which iron is calculated as $Fe_3O_4$). Alternatively the catalyst can be a supported platinum group metal, for example ruthenium supported on graphite. The $H_2/N_2$ ratio of the gas entering the synthesis catalyst is preferably in the range 2.7 to 3.0 when an iron catalyst is used but can be lower, for example down to 2.2 if provision is made to recycle part of the unreacted gas as purge to synthesis gas generation, or to recover hydrogen from such purge gas. Such ratios are suitable also for a ruthenium catalyst, but still lower ratios have been proposed for multi-stage ammonia synthesis. Usually the synthesis includes cooling of reacted synthesis gas, separation of liquid ammonia and recycle of unreacted gas to the synthesis catalyst, but the multi-stage synthesis can be on a once through basis.

The invention is illustrated by the accompanying drawing in which.

Figure 1:
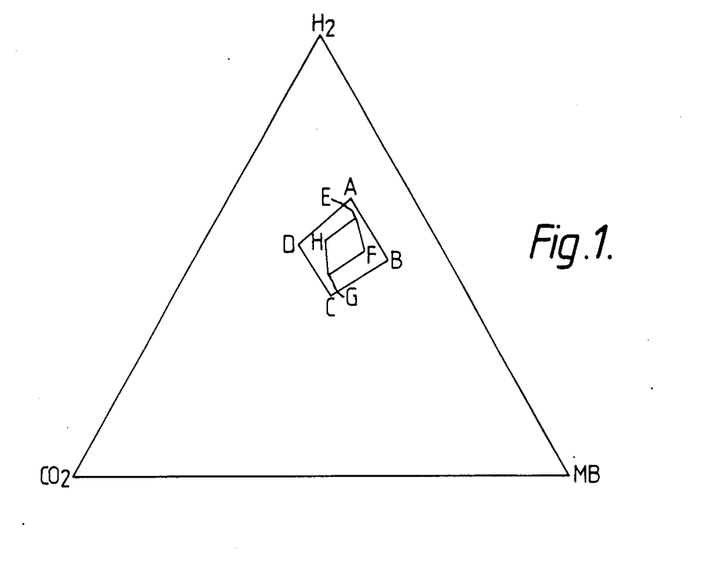
FIG. 1 is a triangular gas composition diagram showing preferred raw gas compositions to be fed to the PSA system.

In FIG. 1 the quadrilateral ABCD represents the $H_2/MB$ ratio range 1.25 to 2.5 in combination with the preferred $CO_2$ content range 10–25% v/v, and quadrilateral EFGH the particularly preferred $H_2/MB$ range 1.5 to 2.1 in combination with the $MB/CO_2$ range 1.3 to 2.5. In each case the MB gas is at least 90, especially at least 95% v/v $N_2$.

Figure 2:
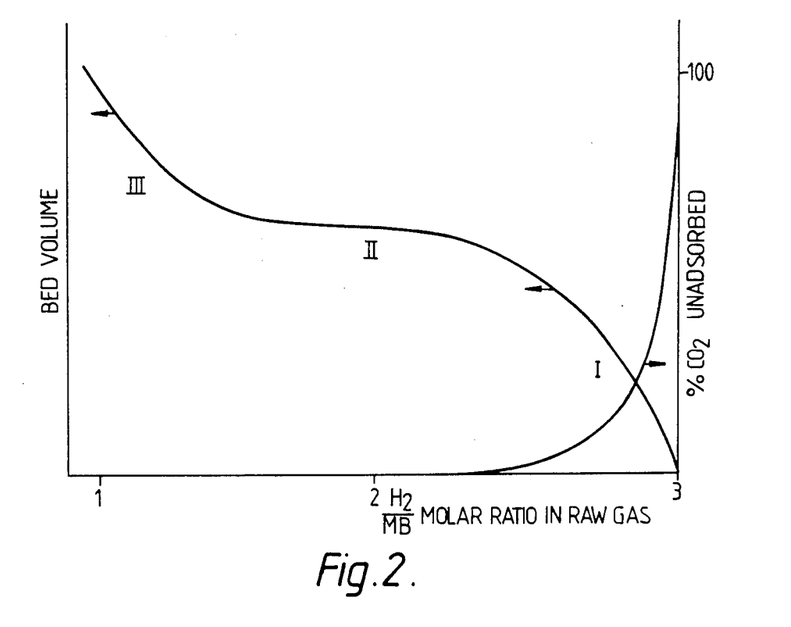
FIG. 2 is a diagram indicating the variation of adsorber bed volume and percentage $CO_2$ retention as a function of $H_2/MB$ ratio.

In FIG. 2 the curve relating to the left-hand axis represents our discovery that there is a region II represented by our defined $H_2/MB$ ratio range over which the bed volume is markedly less sensitive to $H_2/MB$ ratio. This is highly valuable in that a particular PSA plant design is usable for the variety of feed gas compositions that may result from choice of feed gas generation plant and feedstock and unavoidable fluctuations in gas composition. At lower $H_2/MB$ ratios the bed volume is greater (region III), which results in greater expense and decreased hydrogen recovery, and is also much more sensitive to feed gas composition fluctuations. In region I the bed volume is less, but (see right-hand axis) the $CO_2$ retained in the gas is excessive; this problem has previously been solved (in proposals) by the expensive expedient of an external purge.

Figure 3:
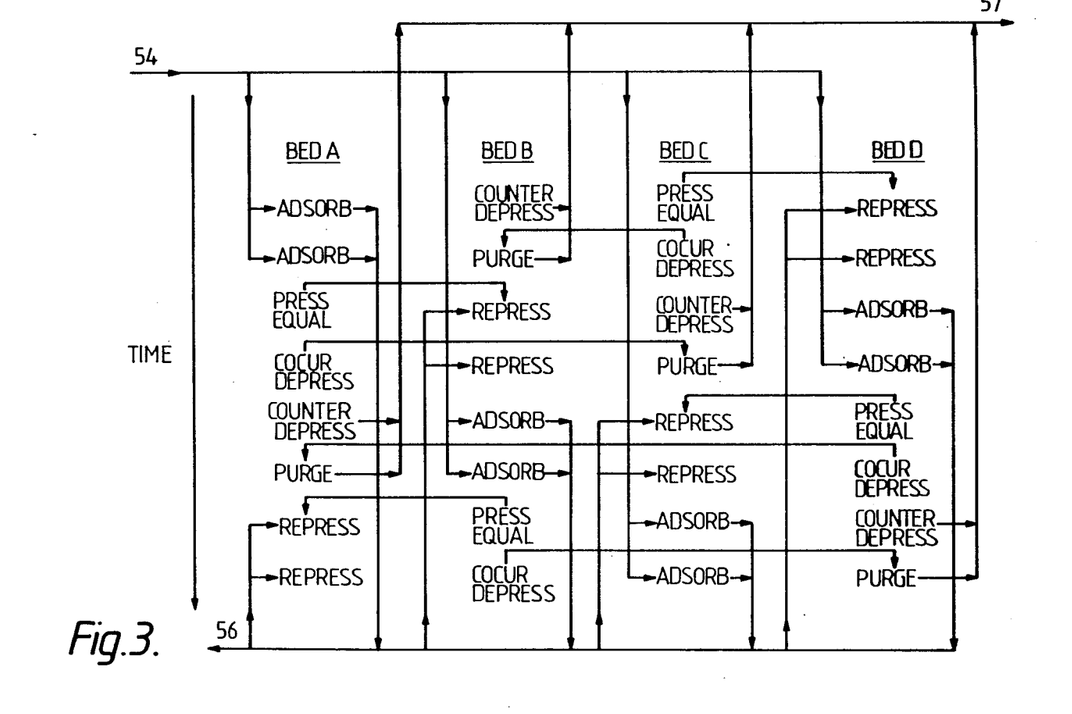
FIG. 3 shows the steps of an illustrative PSA system usable in the process of the invention.
Figure 4:
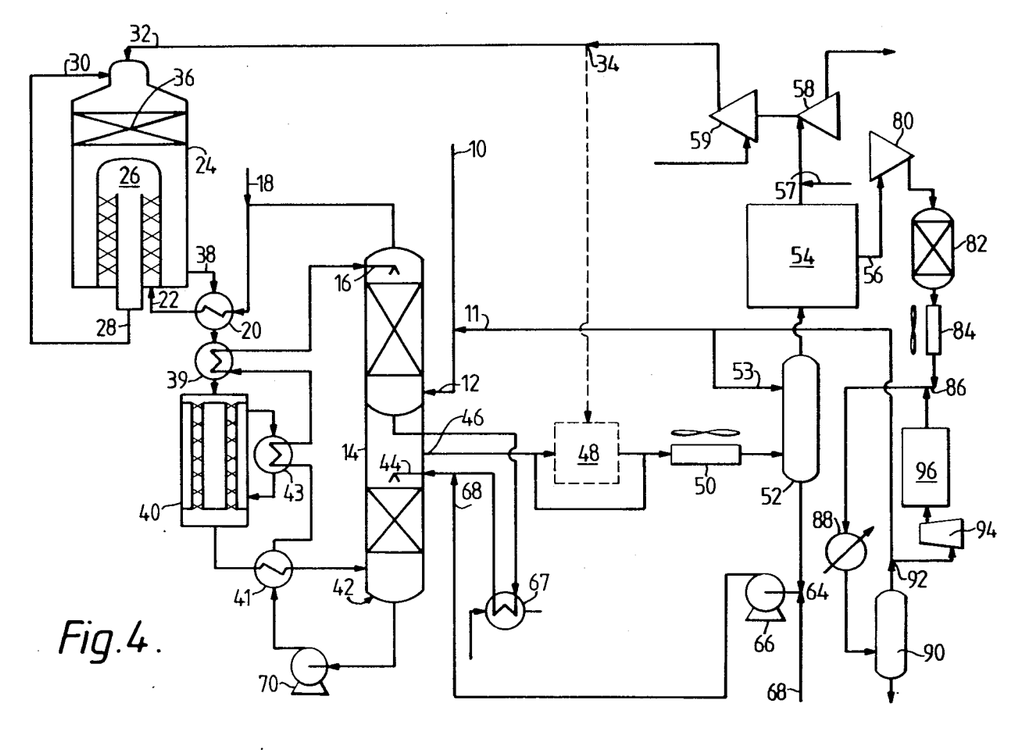
FIG. 4 shows a combination process including raw gas generation, shift with heat recovery. PSA, methanation and ammonia synthesis.
Figure 5:
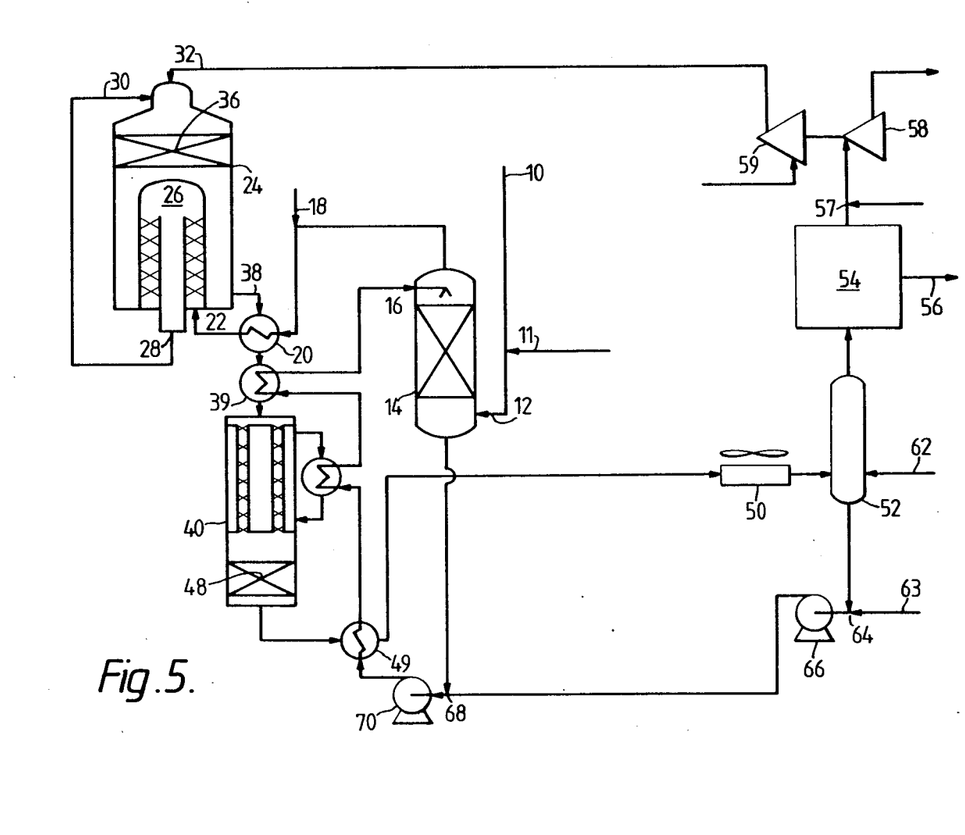
FIG. 5 shows a combination process with selective methanation of CO before PSA.
Figure 6:
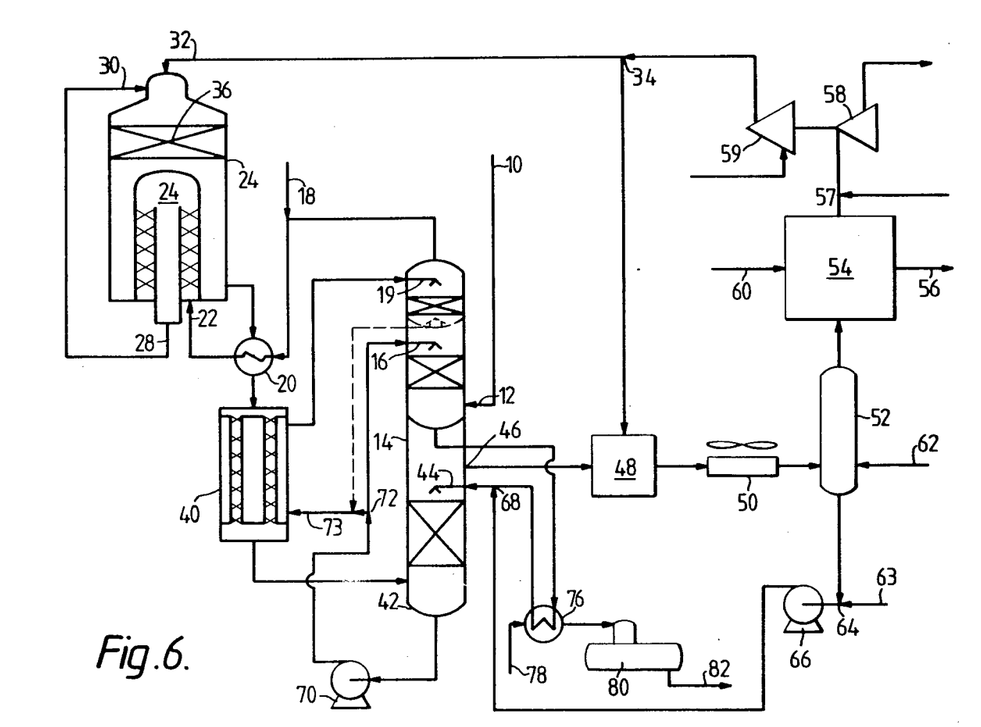
FIG. 6 shows a combination process with selective CO oxidation before PSA.

In FIG. 3 the inlet and outlet streams are numbered as in the flowsheets of FIGS. 4–6 accompanying. The above definition of the characteristics of the PSA system serves as a description of this figure.

Table 1 shows temperatures, pressures, gas compositions and flow rates for the PSA unit, and uses the same numerals.

The product stream "56 integrated" is the resultant of a stream in which for each individual adsorption step the $H_2/N_2$ ratio at an intermediate time was about twice as high as initially and finally; in a 10 bed system using 3 adsorbers out of phase, this variation range is only about 7%.

As a result of the residual CO and $CO_2$ content of stream 56 integrated it is suitable for ammonia synthesis over a ruthenium catalyst, but should be methanated, possibly after compression, before synthesis over an iron catalyst.

TABLE 1

| Position | Temp. °C. | *Press. | Gas composition % v/v | | | | | | +Flow rate |
| --- | --- | --- | --- | --- | --- | --- | --- | --- | --- |
| | | | CO | $CO_2$ | $H_2$ | $CH_4$ | $N_2$ | Ar | |
| 54 inlet | 35 | 35 | 0.31 | 16.07 | 53.09 | 0.48 | 29.43 | 0.61 | 7998 |
| 56 integrated | 40 | 34 | 0.08 | 0.01 | 74.46 | 0.06 | 24.82 | 0.58 | 5493 |
| 57 | 30 | 1.5 | 0.82 | 51.29 6.27 | 1.38 | 39.55 | 0.69 | 2505 | |

*bar abs.
+kg mol h$^{-1}$

In the process shown in FIG. 4 desulphurised natural gas 10 is at 11 mixed with a synthesis purge stream (to be described) and fed at 12 to the upper (saturator) section of tower 14. It contacts a hot water stream (to be described) fed in at 16 over the upper packed saturation zone, then is mixed with more steam fed in at 18. The resulting warm steam/gas mixture (S/G ratio 2 to 5, temperature 150°–250° C., 25–50 bar abs) is preheated at 20 (350°–550° C.) and fed at 22 into annular beds of steam reforming catalyst (supported Ni or Co) heated externally in furnace 24. The resulting hot gas (600°–800° C.) containing CO, $CO_2$, $H_2$, unreacted steam and several percent of $CH_4$ passes into the closed end 26 of tube 22 and returns through inner tube 28 in which it gives up heat to the reacting gas in the annular catalyst bed. The resulting partly cooled gas (450°–650° C.) is fed at 30 into the uppermost (combustion) section of furnace 24, where air or $O_2$-enriched air 32 is fed into it. A flame is formed and the combustion products are brought to equilibrium at a lower $CH_4$ content over secondary reforming catalyst 36. The resulting gas, still at 900°–1050° C., is the source of heat for the outer tubes containing the annular beds of steam reforming catalyst. In heat exchange with these tubes the gas is cooled typically to 450°–650° C. It leaves furnace 24 at 38, is cooled in heat exchanger 20 and water heater 39 to shift inlet temperature and passes into water-cooled shift reactor 40 in which the catalyst is disposed in tubes surrounded by water in a pressure shell to be described. In reactor 40 the shift reaction is brought substantially to equilibrium at a temperature controlled at typically 230°-280° C. and an outlet CO content in the range 0.1 to 1.0% v/v on a dry basis. The outlet temperature is preferably lower by 10°-30° C. than the inlet temperature. The shifted gas is cooled at 41, passed into the lower packed desaturation zone of tower 42 and therein contacts cool water fed in at 44 from a source to be described. The resulting water-depleted gas is fed out, and cooled at 50 to below the dewpoint of steam. Optionally it may, before such cooling, be passed into reactor 48, in which CO is oxidised selectively as described below with reference to FIG. 6. From the gas at below the dewpoint of steam, liquid water is separated in catchpot 52, from which dry gas is taken overhead and passed into selective adsorber 54. Adsorber 54 includes essentially a bed of material such as active carbon or molecular sieve on which $CO_2$ is strongly adsorbed, $H_2$ is very weakly if at all adsorbed and MB gases are partly adsorbed. It also includes such a bed under regeneration and possibly other beds undergoing treatments such as temperature and pressure adjustments, and the necessary change-over valves. From 54 purified ammonia synthesis gas is passed out at 56 to a synthesis gas compressor 80 and thence to an ammonia synthesis plant to be described. A regeneration off gas, containing $CO_2$, $N_2$, some $H_2$ and possibly CO and $CH_4$ is passed out via point 57, whereafter it receives a feed of combustible such as natural gas and possibly synthesis purge gas, to the compressor and combustor (not shown) of gas turbine 58 providing the shaft power for air compressor 59. The composition of the regeneration off-gas will depend on the extent to which the oxidant gas fed at 34 has been $O_2$-enriched before entering compressor 59. If there has been no enrichment, it will be rich in $N_2$ and possibly also in $CH_4$, since the rate of feed of air at 32 may be kept below that necessary to react all the $CH_4$, in order to avoid excessive $N_2$. Further, although it is simplest if the gas passed out at 56 is stoichiometric for ammonia synthesis, it may be preferred to pass out at 56 a gas having an $H_2:N_2$ ratio under 3, and to remove the excess $N_2$ and any $CH_4$ cryogenically before or after compressing the gas. Alternatively the excess $N_2$ and any $CH_4$ can be removed after ammonia synthesis.

The ammonia synthesis gas passed out at 56 is compressed to ammonia synthesis pressure at 80 and (possibly via a feed/effluent heat exchanger not shown) fed into methanator 82 in which its sub-residual content of CO is converted to $CH_4$. The methanated gas is cooled at 84 to 30°-40° C. and mixed with ammonia-containing reacted synthesis gas at 86. The mixture is at 88 chilled to below the dewpoint of ammonia and passed into catchpot 90, in which liquid ammonia is separated. The unreacted gas overhead is divided into a main recycle stream and a purge stream. The main recycle stream is compressed by a few bars in circulator 94 and passed into synthesis reactor 96 which includes one or more catalysts beds (Fe or Ru), quench or indirect temperature control means, a feed/effluent heat exchanger and external heat recovery means such as a boiler, superheater or water heater. The gas after reaction is fed to point 86 already described. The purge stream is fed to point 11, where it joins the natural gas feedstock to the process. (If $CH_4$ is present it is converted to raw synthesis gas in reformer 24. If $N_2$ or noble gases are present, they pass through the reformer and shift reactor but are adequately removed adsorptively at 54. Although dilution of the reformer feed by such non-reacting gases takes place, it has the advantage of increasing the steam-to-$CH_4$ ratio obtainable by saturation in tower 14 and, thus decreasing or removing the need for steam feed 18. Further, such recycle to point 11 means that adsorber 54 is the only means necessary for removing non-condensible gases from the process).

The water system of the process receives cold condensate as the bottoms of catchpot 52 and cold make-up water 63 at 64 and feeds the mixture via pump 66 to point 68 where it is united with a cool stream to be described and whence the whole mixture is fed at 44 over the lower (desaturator) packed section of tower 14. Here the unreacted steam in the shifted gas from reactor 40 condenses into the water, giving a warm water stream which is taken as bottoms and fed via pump 70 to 3 heating stages, by indirect heat exchange first with shifted gas at 41, then at 43 with condensing steam raised in shift reactor 40, then with partly cooled secondary reformer gas at 39. It may then be still entirely liquid or may be partly boiling and is fed at point 16 to the saturation zone of the upper section of tower 14. The cooled water remaining after contacting in the upper section of tower 14 is cooled at 67 by heat exchange with boiler feed water to be treated in a de-aerator (not shown), then united with cold condensate at point 68.

Table 2 shows temperatures, pressures and gas flow rates in a process for producing 1100 metric tons of ammonia per day.

TABLE 2

| Position | Temp °C. | Pressure bar abs. | Gas flow rate kg mol h$^{-1}$ | | | | | | | |
|---|---|---|---|---|---|---|---|---|---|---|
| | | | CO | $CO_2$ | $H_2$ | $CH_4$ | $N_2$ | Ar | $H_2O$ | $NH_3$ |
| *10 | 30 | 46 | — | 5.14 | 37.02 | 1367.37 | 47.14 | | — | — |
| +(11 | 30 | 101 | — | — | 298.89 | 18.65 | 99.63 | 28.18 | — | 18.99) |
| 22 inlet | 425 | 40 | — | 5.14 | 37.02 | 1367.37 | 47.14 | | 3712 | — |
| 32 | 670 | 39 | — | — | — | — | 2453.13 | | 31.37 | — |
| 38 | 540 | 37 | 972.15 | 492.94 | 3537.43 | 23.76 | 2500.27 | | 3100.61 | — |
| 40 outlet | 230 | 36 | 27.47 | 1437.62 | 4482.11 | 23.76 | 2500.27 | | 2155.93 | — |
| +52 overhead | 35 | 35.3 | 27.47 | 1437.62 | 4781.00 | 42.41 | 2568.84 | 59.24 | 15.13 | — |
| 56 | 35 | 35 | 8.93 | — | 4436.37 | 11.88 | 1423.10 | 32.69 | — | — |
| 57 | 35 | 1.5 | 18.54 | 1437.62 | 344.63 | 30.53 | 1145.74 | 26.55 | 15.13 | — |
| 82 outlet | 180 | 130 | — | — | 4409.58 | 20.81 | 1469.86 | 32.69 | 8.93 | — |
| 96 inlet | 260 | 107 | — | — | 18658.80 | 1036.20 | 6201.25 | 1734.39 | — | 1055.60 |
| 96 outlet | 432 | 104 | — | — | 14952.56 | 1036.20 | 4845.83 | 1734.39 | — | 3766.43 |

*This starting gas includes $H_2$ added before desulphurisation and also 53.93 kg mol h$^{-1}$ of $C_{2+}$ hydrocarbons additional to the $CH_4$ shown.
+Whereas synthesis purge gas (composition as 96 inlet) could with advantage be added at 11, the calculated flow rates are based on addition at point 53. This is process air including 652.5 kg mol h$^{-1}$ of $O_2$.

In the process shown in FIG. 5 desulphurised natural gas 10 mixed at 11 with ammonia synthesis purge gas is fed at 12 to the bottom of saturator tower 14. It contacts a hot water stream (to be described) fed in at 16 over the packed saturation zone, then may be mixed with more steam fed in at 18. The resulting warm steam/gas mixture is reacted and cooled to shift outlet temperature by the stream described with reference to FIG. 4 and passed into water-cooled shift/methanation reactor 40 in the upper part of which the shift reaction takes place. The resulting gas passes, via an optional cooler or water injection (not shown) into supported ruthenium catalyst 48 in the lower part of reactor 40, in which CO is reacted with $H_2$ to produce $CH_4$ but $CO_2$ remains unreacted. The methanated gas is cooled at 49 in heat exchange with water to be described, then cooled at 50 to below dewpoint of steam, whereafter liquid water is separated in catchpot 52. (If desired the cooled gas from 49 can be contacted with cool water before 50). Dry gas taken overhead from 52 is passed into selective adsorber 54, as in FIG. 4. The gas entering adsorber 54 may include moist synthesis purge gas—$H_2$, $N_2$, $CH_4$—as fed to catchpot 52 at 62 instead of or in addition to point 11. The composition of the regeneration off-gas will depend on the factors described with reference to FIG. 4.

The water system of the process receives cold condensate as the bottoms of catchpot 52 and cold make-up water 63 at 64 and feeds the mixture via pump 66 to point 68 where it is united with a cool stream from saturator 14. The whole mixture passes to pump 70 and thereafter is heated in 3 steps, by indirect heat exchange first with methanated gas at 42, then with condensing steam at 43, then with partly cooled secondary reformer gas at 39. It may then be still entirely liquid or may be partly boiling and is fed at point 16 to saturator tower 14.

In a typical process according to FIG. 5 a shift outlet gas of % v/v composition $CH_4$ 0.22, CO 0.26, $CO_2$ 13.5, $H_2$ 42.0, $N_2$ 23.5, $H_2O$ 2.4 at 230° C., 36 bar abs. pressure, is fed to a supported ruthenium methanation catalyst. The outlet CO content is to be of the order of 25 ppm v/v and the $CO_2$ is to be methanated to the extent of at most one hundredth part. The resulting gas is suitable for conversion to ammonia synthesis gas by drying, then selective adsorption of $CO_2$ completely, $CH_4$ partly, $N_2$ to the extent of one-third and $H_2$ to the extent of one-fiftieth part. The ammonia synthesis gas then needs no further purification and is fed to an ammonia synthesis loop.

In the process according to FIG. 6 desulphurised natural gas 10 is fed at 12 to the upper (saturator) section of tower 14. It contacts a hot water stream (to be described) fed in at 16 over the lower packed saturation zone, then is both heated and mixed with more steam by contact with a steam/water mixture (to be described) fed in at 19. The 2-stage saturator may make steam addition at 18 unnecessary. The resulting warm steam/gas mixture is treated as in FIG. 4 down to the water removal stage. The water-depleted gas us fed out at 46, cooled further, typically to 30°-50° C. (by means not shown), and passed into reactor 48, in which CO is oxidised catalytically by air or enriched air. The gas may be cooled to oxidation catalyst inlet temperature and subjected to a further oxidation stage (not shown). It is cooled at 50 to below the dewpoint of stream, whereafter liquid water is separated in catchpot 52, from which dry gas is taken overhead and passed into selective adsorber 54, as in FIG. 4. Adsorber 54 can receive at 60 a feed of $N_2$ separated from ammonia synthesis reacted gas. If $O_2$-enriched air is fed at 34, this is the product of air separation, which would be upstream of compressor 59 and would include a pre-compressor driven by turbine 58. It would give also an $N_2$ stream suitable for feeding at point 60. Turbine 58 exhausts via heat recoveries (not shown).

The water system of the process receives cold condensate as the bottoms of catchpot 52 and cold make-up water 63 at 64 and feeds the mixture via pump 66 to point 68 where it is united with a cool stream to be described and whence the whole mixture is fed at 44 over the lower (desaturator) packed section of tower 14. Here the unreacted steam in the shifted gas from reactor 40 condenses into the water, giving a warm water stream which is taken as bottoms and sent by pump 70 to point 72. From point 72 a first stream of warm water is fed to lower packed saturation zone at 16 and a second stream is fed into the shell of reactor 40, in which it is brought just to the boil but without forming a distinct steam phase. The steam/water mixture emerging from the shell of reactor 40 is fed to the upper packed saturator section of tower 14, where it partly evaporates and completes the addition of steam to the natural gas feed. Residual hot water is taken as bottoms from the upper section of tower 14 and cooled at 76 in heat exchange in a closed cooling circuit (not shown) or with boiler feed water fed in at 78, after being warmed at 76, deaerated at 81 and sent out at 83 to further heat recoveries in the effluent of gas turbine 58. The cooled saturator water from 76 is united at 68 with cold condensate and make-up water. As an alternative, heat exchanger 76 could be a cooling coil in the bottom of the upper section (saturator) of tower 14.

The water/steam system of FIG. 6 could be used in the processes of FIGS. 4 and 5, and vice versa. When cooling is by steam raising in a closed ("first") circuit filled with high quality boiler feed water; the tubes and shell of reactor 40 can be made of carbon steel, but when the water circulated through the shift reactor shell in the process of FIG. 6 also passes through tower 14 and contains $CO_2$ the tubes and shell are preferably made of corrosion-resistant alloy.

In a further alternative form of tower 14 (dotted path), the heat exchange in shift reactor 40 generates a steam/water mixture, and thus is fed to the upper bed of the saturator section of the tower. However, between the two beds of the saturator section there is a chimney-plate from which water passes back to point 73, where it receives make-up warm water from point 72 and then re-enters the shift reactor water shell. Natural gas partly saturated by warm water fed at 16 as before passes up through the chimney plate and is finally heated and saturated in the upper bed.

We claim:

1. A process for the production of ammonia comprising
   (i) forming ammonia synthesis gas by
   (a) reacting a volatile hydrocarbon feedstock with steam and a gas containing oxygen and nitrogen at a pressure in the range 25 to 50 bar abs. using process conditions and reactant proportions so as to produce a crude gas containing
   hydrogen,
   unreacted steam, and
   medium boiling gas containing
   carbon monoxide, and
   nitrogen in an excess of that required in the ammonia synthesis gas,
and in which the molar ratio of hydrogen plus carbon monoxide to nitrogen and other medium boiling gas, if any, is in the range 1.25 to 2.50, and the content of carbon monoxide plus carbon dioxide, if any, is in the range 10 to 25% v/v on a dry basis;

(b) converting carbon monoxide to carbon dioxide by subjecting the crude gas to a single stage of catalytic shift reaction to produce a raw gas having a carbon monoxide content of less than 0.5% v/v on a dry basis and in which at least 90% of the total medium boiling gas is nitrogen, said shift reaction being controlled at 230° to 280° C. and operated in indirect heat exchange with a coolant, thereby producing a stream of heated coolant, and at least some of the steam employed in the step (a) being introduced by contacting the feedstock with a stream of heated water, comprising hot water or a mixture of hot water and steam, said stream of heated water comprising said heated coolant, where the coolant is water, or being obtained by indirect heat exchange with the stream of heated coolant;

(c) removing carbon dioxide and medium boiling gas, including the excess of nitrogen, from the raw gas by a pressure swing adsorption process, to give a product gas; and (d) methanating the product gas to convert residual carbon oxides therein to methane; and (ii) passing the ammonia synthesis gas over an ammonia synthesis catalyst to produce a reacted gas stream containing synthesised ammonia, and separating synthesised ammonia from said reacted gas stream.

2. A process according to claim 1 in which the pressure swing adsorption system used includes an adsorption step producing a product gas varying in composition with time between an initial and final relatively low $H_2/N_2$ volume ratio and an intermediate relatively high $H_2/N_2$ volume ratio, the integrated $H_2/N_2$ ratio over the whole adsorption step being at the level required in the product ammonia synthesis gas.

3. A process according to claim 2 in which the adsorption pressure is in the range 30 to 40 bar abs. and is 10 to 15 times the purge and final dump pressure.

4. A process according to claim 1 wherein said medium boiling gas further contains, argon and methane.

5. A process according to claim 1 wherein at least 95% v/v of the total medium boiling gas is nitrogen.

6. A process according to claim 1 wherein said raw gas has a total medium boiling point gas to carbon dioxide volume ratio between 1.3 and 2.5.

7. A process according to claim 6 wherein said raw gas has a hydrogen to total medium boiling gas volume ratio between 1.5 and 2.1

8. A process to claim 2 wherein the swing adsorption step includes a step wherein each bed is repressurized counter-currently with said product gas prior to its adsorption duty.

9. A process according to claim 1 wherein the shift outlet temperature is 10° to 30° C. lower than the shift inlet temperature.

10. A process according to claim 11 wherein:
(a) the waste gas from pressure swing adsorption, containing carbon dioxide and combustibles, is used to power a gas expander producing at least part of the power required to compress at least one of the ammonia synthesis gas product, said carbonaceous feedstock, steam and gas containing oxygen and nitrogen; and
(b) the heat exchange in the catalytic shift reaction is operated without producing external steam.

11. A process according to claim 1 wherein the coolant is water under pressure.

12. A process according to claim 11 wherein the coolant is boiling water.

13. A process according to claim 1 wherein, in step (a), using a volatile hydrocarbon as the feedstock, the feedstock is reacted with steam over an externally heated catalyst in a primary reformer and then the resultant primary reformed gas stream is reacted with the gas containing oxygen and nitrogen and passed over a catalyst in a secondary reformer so as to produce a hot secondary reformed gas stream, and the heat required for the primary reforming is obtained by indirect heat exchange with the hot secondary reformed gas stream.

14. A process according to claim 1 wherein the ammonia synthesis gas is mixed with recycle gas and passed over the synthesis catalyst, part of the reacted gas remaining after separation of the synthesised ammonia is recycled to the synthesis as the recycle gas, and the remainder of the reacted gas is added to the feedstock prior to contact thereof with the stream of hot water.

15. A process according to claim 2 wherein, in the pressure swing adsorption step, the raw gas is fed simultaneously to a plurality of adsorbent beds out of phase with one another.

* * * * *